United States Patent [19]
Yamada et al.

[11] Patent Number: 5,576,121
[45] Date of Patent: Nov. 19, 1996

[54] LLITHIUM SECONDARY BATTERY AND PROCESS FOR PREPARING NEGATIVE-ELECTRODE ACTIVE MATERIAL FOR USE IN THE SAME

[75] Inventors: Kazuo Yamada, Kitakatsuragi-gun; Takehito Mitate, Yamatotakada; Tetsuya Yoneda, Nabari; Naoto Nishimura, Kitakatsuragi-gun, all of Japan

[73] Assignee: Sharp Kabushiki Kaisha, Osaka, Japan

[21] Appl. No.: 469,926

[22] Filed: Jun. 6, 1995

[30] Foreign Application Priority Data

Oct. 27, 1994 [JP] Japan ................................ 6-264005

[51] Int. Cl.$^6$ ...................................................... H01M 4/48
[52] U.S. Cl. ........................ 429/220; 429/218; 429/194; 429/197; 429/217; 429/122; 423/23; 423/44
[58] Field of Search .................................. 429/122, 218, 429/220, 194, 197, 217, 220; 423/23, 44

[56] References Cited

U.S. PATENT DOCUMENTS 4,939,049  7/1990  Ishibashi et al. ........................ 429/194
5,284,721  2/1994  Beard ...................................... 429/194
5,432,029  4/1995  Mitate et al. ............................ 429/218

FOREIGN PATENT DOCUMENTS

0627776A3  5/1994  European Pat. Off. .
5-258773   of 1993  Japan .
5-21065    of 1993  Japan .
6-349482   of 1994  Japan .
6-325753   of 1994  Japan .

OTHER PUBLICATIONS

6001 Chemical Abstracts, vol. 116, No. 8, Feb. 24, 1992, Columbus, Ohio.

*Primary Examiner*—Bruce F. Bell
*Attorney, Agent, or Firm*—Nixon & Vanderhye

[57] ABSTRACT

A lithium secondary battery is disclosed which comprises: a positive electrode; a negative electrode; and a nonaqueous ion conductor, the negative electrode including a primary negative-electrode active material of a graphite which is capable of intercalation and deintercalation of lithium ions, and a secondary negative-electrode active material of a cupric oxide having a low crystallinity.

17 Claims, 3 Drawing Sheets

FIG. 4 ial for use in the same

LITHIUM SECONDARY BATTERY AND PROCESS FOR PREPARING NEGATIVE-ELECTRODE ACTIVE MATERIAL FOR USE IN THE SAME

BACKGROUND OF THE INVENTION

1. Field of the Invention

The present invention relates to lithium secondary batteries and a process for preparing a negative-electrode active material for use therein. More particularly, the present invention relates to a lithium secondary battery having a negative electrode formed of graphite which is capable of intercalation and deintercalation of lithium.

2. Related Art

As down-sizing, energy saving and cordless function have been increasingly required for electronic devices, secondary batteries utilizing alkali metals such as lithium have been attracting more attentions as batteries for use in the electronic devices.

Where an alkali metal such as lithium is employed alone for the negative electrode of a secondary battery, dendrite (branching tree-like crystal) is generated on a dissolution-deposition surface of the metal during repeated charge-discharge cycles, i.e., during metal dissolution-deposition process. The dendrite further grows to penetrate through the separator of the secondary battery during the repeated charge-discharge cycles, thereby coming into contact with the positive electrode. This will result in a short circuit within the secondary battery.

It has been found that, if an alkali metal alloy is employed for the negative electrode of a secondary battery, the growth of dendrite can be suppressed in comparison with the case where the alkali metal is employed alone, thereby improving the charge-discharge cycle characteristics. However, the use of an alkali metal alloy cannot completely prevent the generation of dendrite and there still exists a possibility of the short circuit within the secondary battery.

In recent years, carbon materials and organic materials such as conductive polymers have been developed to be used for a negative electrode, taking advantage of a dope-undope process of alkali metal ions rather than a dissolution-deposition process or dissolution-deposition intrabody diffusion process of an alkali metal or an alloy thereof. The use of these materials makes it possible to avoid the generation of dendrite in principle, remarkably alleviating the problem of short circuits within secondary batteries.

In general, carbon is chemically stable and can be doped with either an electron donor or electron acceptor. Therefore, it is a promising material for an electrode of a battery.

Where a carbon material is used for an active material for a negative electrode, lithium ions can be intercalated between carbon layers in an intercalation ratio of one lithium atom to six carbon atoms, i.e., $C_6Li$ at maximum. In this case, the theoretical discharge capacity per unit weight of carbon is 372 mAh/g. Carbon materials have large variations in their structure. The size and arrangement of hexagonal nets each formed with six carbon atoms varies depending on the starting material and production process.

Carbon materials used as a negative-electrode active material are disclosed, for example, in Japanese Unexamined Patent Publications No. 62-90863 (1987), No. 62-122066 (1987), No. 63-213267 (1988), No. 1-204361 (1989), No. 2-82466 (1990), No. 3-252053 (1991), No. 3-285273 (1991) and No. 3-289068 (1991). None of these carbon materials achieves the theoretical capacity described above and, hence, exhibits a satisfactory charge-discharge capacity when used as a material for the fabrication of a battery.

R. Fong, U. Sacken and J. R. Dahn reported in J. Electrochem. Soc., Vol. 137, pp. 2009 (1990) that the use of graphite as a negative-electrode active material realized a discharge capacity close to the theoretical capacity. However, graphite is not necessarily satisfactory in a practical use because the discharge capacity was measured under application of a small current in accordance with this literature.

Japanese Unexamined Patent Publications No. 4-112455 (1992), No. 4-115457 (1992), No. 4-115458 (1992), No. 4-237971 (1992) and No. 5-28996 (1993), for example, disclose secondary batteries utilizing graphite materials as negative-electrode active materials. However, none of these graphite materials attains the theoretical capacity and realizes a negative electrode having a sufficient negative-electrode capacity for a secondary battery.

Further, there have been proposed several composite materials each composed of a carbon material and other materials to be used as negative-electrode active materials. However, these materials each involve unsolved problems as described below.

Japanese Unexamined Patent Publication No. 5-21065 (1993) discloses the use of a negative-electrode comprising: lithium ions; a chalcogen compound which generates an average voltage of not greater than 2 V ($Li/Li^+$) by intercalation and deintercalation of lithium ions; and a carbon material capable of intercalating and deintercalating lithium ions. Since the potential at which lithium ions are intercalated into and deintercalated from the chalcogen compound is higher than that at which lithium ions are absorbed into and desorbed from graphite, a battery utilizing such a negative electrode suffers from a lower battery voltage and reduced energy density.

Japanese Unexamined Patent Publication No. 4-184863 (1992) discloses a battery utilizing a negative electrode of a carbon material coated with a metal (nickel or copper). Further, Japanese Unexamined Patent Publication No. 4-259764 (1992) discloses a battery utilizing a negative electrode of a carbon composite material comprising carbon and a metal (at least one kind of metal which is not alloyed with lithium). Although the use of these negative electrodes improves charge-discharge cycle characteristics and high-rate discharge capacity after storage at a high temperature, a significant increase in the capacity of the negative electrode cannot be expected.

In Japanese Unexamined Patent Publication No. 3-216960 (1991), there is disclosed a secondary battery having a negative electrode of a porous carbon material on the surface of which a lithium layer is formed such that pores on the surface of the carbon material are not occluded, thus allowing for large-current discharge and improved cycle life and safety. Further, in Japanese Unexamined Patent Publication No. 4-39864 (1992), there is disclosed a secondary battery having a negative electrode of a carbon material impregnated with an alloy of a metal which can be alloyed with an active substance used therein. The secondary battery exhibits an increased electrode capacity and improved charge-discharge cycle characteristics and self-discharge characteristics. However, the production of the negative electrodes for these secondary batteries requires additional process steps.

In Japanese Unexamined Patent Publication No. 4-179049, there is disclosed a negative electrode of a composite material comprising a conductive polymer and a metal and/or carbon material. A battery having such a negative electrode is flexible and has a long cycle life. However, there still exists a problem of unsatisfactory charge-discharge capacity.

Japanese Unexamined Patent Publication No. 5-258773 proposes a negative electrode which is prepared by blending two or more kinds of negative electrode materials selected from $Nb_2O_5$, $MoO_2$, $RuO_2$, $WO_2$, metal lithium, $LiTiS_2$, CuO and carbon materials that are capable of doping and undoping lithium. The negative electrode facilitates the detection of discharge termination voltage. However, the negative electrode cannot increase the capacity of a battery.

As can be understood from the foregoing, any of the aforesaid negative electrodes employing various carbon materials or graphite materials as a negative-electrode active material cannot attain the aforesaid theoretical capacity (372 mAh/g), thus failing to exhibit a satisfactory capacity. Though the use of the graphite material essentially allows the negative electrode to charge and discharge up to the theoretical capacity, the charge and discharge current is too small for a practical application. With the negative electrode comprising a chalcogen compound which generates an average voltage of not greater than 2 V ($Li/Li^+$) by intercalation and deintercalation of lithium ions, and a carbon material which is capable of intercalation and deintercalation of lithium ions, the potential at which lithium ions are intercalated into and deintercalated from the chalcogen compound is relatively high, thereby reducing the battery voltage and energy density. Further, the composite negative electrode comprising a carbon material and a metal which is not alloyed with lithium cannot improve the negative electrode capacity. Still further, the composite negative electrode comprising a carbon material coated with lithium or a metal which can be alloyed with lithium requires additional process steps for production thereof. Yet further, the composite negative electrode comprising a conductive polymer and a metal and/or a carbon material has a reduced charge discharge capacity.

The present inventors have found that the capacity of a secondary battery can be significantly improved by employing copper oxide as a secondary active material for the negative electrode of the secondary battery. Copper oxide is a material conventionally proposed to be used as a positive-electrode active material mainly for use in a primary battery. When used as the secondary active material for the negative electrode, copper oxide behaves with a nature of a positive-electrode material for a primary battery, thereby reducing an initial charge-discharge efficiency. Therefore, a positive-electrode active material serving as a lithium supply source should be used in an excessive amount for the positive electrode when the secondary battery is assembled. This may hinder the improvement of battery capacity. Thus, it has been desired to improve the characteristics of the initial charge-discharge efficiency attributable to copper oxide in the copper oxide composite negative electrode.

SUMMARY OF THE INVENTION

In accordance with one aspect of the present invention, there is provided a lithium secondary battery comprising a positive electrode, a negative electrode, and a nonaqueous ion conductor, the negative electrode including a primary negative-electrode active material of a graphite material which is capable of intercatation and deintercalation of lithium ions and a secondary negative-electrode active material of a cupric oxide having a low crystallinity.

In accordance with another aspect of the present invention, there is provided a lithium secondary battery comprising a positive electrode, a negative electrode, and a non-aqueous ion conductor, the negative electrode including a primary negative-electrode active material of a graphite material which is capable of intercalation and deintercalation of lithium ions and a secondary negative-electrode active material of either a cuprous oxide resulting from reduction of a cupric oxide having a low crystallinity or a mixture of the cuprous oxide and the cupric oxide.

In accordance with yet another aspect of the present invention, there is provided a lithium secondary battery comprising a positive electrode, a negative electrode, and a nonaqueous ion conductor, the negative electrode including a primary negative-electrode active material of a graphite material which is capable of intercalation and deintercalation of lithium ions, and a secondary negative-electrode active material of lithium-containing copper oxide.

In accordance with still another aspect of the present invention, there is provided a method for preparing a negative-electrode active material, comprising the step of providing a cupric oxide having a low crystallinity by heat-treating a source material for the cupric oxide at a temperature not higher than 600° C. and not lower than a temperature at which the source material decomposes into the cupric oxide.

DESCRIPTION OF THE PREFERRED EMBODIMENTS

According to the present invention, the effect of copper oxide as the secondary negative-electrode active material for the lithium secondary battery is enhanced by imparting copper oxide with a suppressed nature as a positive-electrode active material for a primary battery and with an enhanced nature as a negative-electrode active material for a secondary battery.

The lithium secondary battery of the present invention includes a composite negative electrode having a higher capacity than a conventional composite negative electrode and exhibiting an improved initial charge-discharge efficiency, and thus has a high capacity.

In the present invention, a cupric oxide having a low crystallinity can be used as a secondary active material for the negative electrode of the lithium secondary battery. The low crystallinity herein means that the cupric oxide is in an amorphous state or in a microcrystal-aggregative state in terms of X-ray crystallography. More specifically, the cupric oxide of a low crystallinity has broad peaks in an X-ray diffraction pattern. The broader a half band width, the lower the crystallinity. The narrower the half band width, the higher the crystallinity. The cupric oxide has a peak around 38.9° which represents (111) plane in its X-ray diffraction pattern, and the half band width thereof is preferably not less than 0.30°. The upper limit of the half band width is not particularly specified. This means that a cupric oxide in a completely amorphous state can be used.

The cupric oxide of a low crystallinity is preferably prepared by heat-treating a copper compound. More specifically, the copper compound is heat-treated at a temperature not higher than 600° C. and not lower than a temperature at which the copper compound decomposes into the cupric oxide. If the heat-treatment temperature is lower than the decomposition point of the copper compound, cupric oxide cannot be obtained. If the heat-treatment temperature is higher than 600° C., the crystallization of the resultant cupric oxide proceeds too much.

Examples of specific copper compounds for use in the invention include cupric hydroxide, basic cupric carbonate, cupric formate, cupric acetate, cupric benzoate, cupric nitrate, cupric sulfate, cupric sulfide, cupric chloride, cupric bromide, cupric phosphate, cupric pyrophosphate, cupric stearate, cuprous hydroxide, basic cuprous carbonate, cuprous formate, cuprous acetate, cuprous benzoate, cuprous nitrate, cuprous sulfate, cuprous sulfide, cuprous chloride, cuprous bromide, cuprous phosphate, cuprous pyrophosphate and cuprous stearate. The heat-treatment may be carried out in an air atmosphere, an oxygen atmosphere or a like atmosphere. A copper compound having oxygen can be heat-treated in an inert atmosphere.

The cupric oxide having a low crystallinity may be reduced into a cuprous oxide by heat-treatment in a reducing atmosphere. The X-ray crystallographic characteristics of the cuprous oxide thus obtained are not particularly specified herein. However, the crystallographic characteristics of the cuprous oxide obtained by the reduction are influenced to some extent by the characteristics of a cupric oxide used as the source material and, hence, the aforesaid amorphous cupric oxide having excellent characteristics is preferably used as the source material. Exemplary reductant gases to be used for the heat-treatment in a reducing atmosphere include hydrogen gas and hydrocarbon gases such as methane, ethane, propane, ethylene and acetylene. The reduction-treatment temperature is preferably not higher than 600° C. and not lower than a temperature at which the reductant gas serves for reduction. If the reduction-treatment temperature is higher than 600° C., the characteristics attributable to the source material or the cupric oxide having a low crystallinity are degraded. It should be noted that perfect reduction is not necessarily required, that is, the source material or the cupric oxide having a low crystallinity may be present as inclusions in the resultant cuprous oxide.

A lithium-containing copper oxide is obtained by mixing a lithium compound with a copper compound and calcinating the mixture. Examples of specific copper compounds to be used include cupric hydroxide, basic cupric carbonate, cupric formate, cupric acetate, cupric benzoate, cupric nitrate, cupric sulfate, cupric sulfide, cupric chloride, cupric bromide, cupric phosphate, cupric pyrophosphate, cupric stearate, cuprous hydroxide, basic cuprous carbonate, cuprous formate, cuprous acetate, cuprous benzoate, cuprous nitrate, cuprous sulfate, cuprous sulfide, cuprous chloride, cuprous bromide, cuprous phosphate, cuprous pyrophosphate and cuprous stearate. Examples of specific lithium compounds to be used include lithium hydroxide, lithium carbonate, lithium oxide, lithium formate, lithium sulfate, lithium nitrate, lithium sulfide, lithium stearate and lithium tartarate. The calcination temperature of lithium-copper oxide composition is about 300° C. to about 2000° C. The calcination temperature is preferably about 700° C. to about 1000° C. in view of convenience for production process and apparatus.

The processes of mixing the lithium compound and copper compound and of calcinating the mixture are carried out in an oxygen-containing atmosphere, e.g., in the air or in oxygen gas, or in an inert atmosphere, e.g., in nitrogen gas. The atmosphere is appropriately selected in accordance with the kinds of source materials to be used.

A graphite material to be used as a negative-electrode active material in the present invention is preferably such that the mean interlayer distance $d_{002}$ between (002) planes is 0.335 nm to 0.34 nm, the crystallite size Lc in the (002) plane direction is not less than 10 nm and the crystallite size La in the (110) plane direction is not less than 10 nm. These values are all measured by the X-ray wide-angle diffraction method. Such a graphite material provides for a negative electrode having a high capacity.

Factors that influence the capacity and charge-discharge potential of the negative electrode involve the characteristics reflecting the layer structure of carbon. One such factor is an interlayer distance $d_{002}$ between (002) planes (i.e., interlayer spacing) and crystallite size. An increased crystallinity of a graphite material allows the lithium deintercalation potential to become close to the potential of lithium, thereby providing for a carbon electrode of a higher capacity. To realize a lithium secondary battery of an increased capacity, the mean interlayer distance $d_{002}$ of the graphite material is preferably 0.335 nm to 0.340 nm, which is determined by the X-ray wide-angle diffraction analysis. Where the crystallite sizes in the (002) plane direction and in the (110) plane direction are less than 10 nm, the crystallinity of the graphite material is low. Therefore, a lithium secondary battery including such a graphite material of a low crystallinity has an impractically low capacity.

Exemplary graphite materials which satisfy the requirements for the aforesaid characteristics include natural graphite, Kish graphite, synthetic graphite materials that are obtained from easily graphitable carbon materials such as petroleum coke or coal coke, expanded graphite, and pre-treated graphite materials such as surface-modified graphite particles coated with amorphous carbon. The surface-modified graphite particles are prepared by coating graphite core particles having a high crystallinity with a carbon material having a low crystallinity by way of a vapor phase deposition method such as CDV, or by calcinating a mixture of graphite particles and such a carbon material as tar. The graphite material may be in a spherical or flake shape, or may be particles obtained by pulverizing the spherical or flake-shaped graphite material.

The diameter of graphite particles for use as the primary negative-electrode active material is preferably not greater than 80 μm, which is determined as a peak particle size in a volume-based particle size distribution measured by way of laser diffraction method. If graphite particles having a particle size greater than 80 μm are used as the primary negative-electrode active material, the contact area of the graphite particles with an electrolytic medium is relatively small, resulting in decreased diffusion of lithium ions into the particles or in decreased reaction sites on the particles. This makes it difficult for the resultant secondary battery to charge and discharge with a large current.

The ratio of the secondary negative-electrode active material (copper oxide or lithium-containing copper oxide composition) to graphite varies depending on the kinds and particle sizes of graphite and copper oxide, but is preferably 1:99 to 40:60 (weight ratio). If the proportion of copper oxide is less than 1, the effect of copper oxide mixed with graphite cannot be expected. On the other hand, if the proportion of copper oxide is greater than 40, reaction sites for lithium ions at the time of charge and discharge are reduced. A lithium secondary battery utilizing a negative electrode containing a secondary active material in a proportion out of the aforesaid range exhibits an impractically low battery capacity.

The negative electrode is formed by mixing a binder with the graphite material and copper oxide. Exemplary binders include fluoropolymers such as polytetrafluoroethylene and polyvinylidene fluoride, polyolefin-based polymers such as polyethylene and polypropylene, and synthetic rubbers, but not limited thereto. The binder may be added in a powder form to a mixture of graphite and copper oxide, or after dispersed in a solution or dissolved in a solvent. The ratio of the binder to the mixture of graphite and copper oxide is preferably 1:99 to 30:70 (weight ratio). If the ratio of the binder is greater than 30, the resistance or polarization of a negative electrode is increased, thereby reducing the discharge capacity thereof. A lithium secondary battery fabricated with such a negative electrode is not suitable for practical use. If the ratio of the binder is less than 1, the binding ability is lost, resulting in falling-off of the active material and in a reduced mechanical strength. This makes the fabrication of the battery difficult.

The secondary battery of the present invention may be optionally provided with a current collector for collecting current from the negative electrode. Exemplary current collectors include a metal foil, a metal mesh and three-dimensional porous metal. The metal to be used for the current collector is preferably insusceptible to alloy formation with lithium in view of mechanical strength which would be degraded during repetition of charge-discharge cycles. Particularly preferred metals for the current collector are iron, nickel, cobalt, copper, titanium, vanadium, chromium, manganese and alloys thereof.

Exemplary ion conductors for use in the lithium secondary battery of the present invention include organic electrolytes, solid polymer electrolytes; solid inorganic electrolytes and molten salts, among which the organic electrolytes are particularly preferable.

Examples of specific solvents for the organic electrolytes include such esters as propylene carbonate, ethylene carbonate, butylene carbonate, diethyl carbonate, dimethyl carbonate, methylethyl carbonate, Y-butyrolactone, methyl formate, methyl acetate and methyl propionate, tetrahydrofuran, such substituted tetrahydrofurans as 2-methyltetrahydrofuran, such ethers as dioxolane, diethyl ether, dimethoxyethane, diethoxyethane and methoxyethoxyethane, dimethylsulfoxide, sulfolane, methylsufolane and acetonitrile, but not limited thereto. These solvents may be used either alone or in combination.

Examples of specific electrolytes include such lithium salts as lithium perchlorate, lithium borofluoride, lithium fluorophosphate, arsenic lithium hexafluoride, lithium trifluoromethane sulfonate, lithium halides and lithium chloroaluminate, but not limited thereto. These electrolytes may be used either alone or as mixtures thereof. An electrolyte is prepared by dissolving one or more electrolytes in a solvent selected from the aforesaid solvents.

Exemplary positive-electrode active materials used in the lithium secondary battery of the present invention include lithium-containing oxides of the composition formula $Li_xM_{1-y}N_yO_2$ (wherein M represents Fe, Co, Ni or Mn, N represents a transition metal, preferably an element of group IVB or VB) such as $LiCoO_2$, $LiNiO_2$, $LiFeO_2$, $LiVO_2$ and $LiMnO_2$, and of the composition formula $LiMn_{2-z}N_zO_4$ (wherein N represents a transition metal, preferably an element of group IVB or VB) such as $LiMn_2O_4$.

The positive electrode is fabricated by blending a conductive material, a binder and, if necessary, a solid electrolyte with the positive-electrode active material.

Exemplary conductive materials include such carbon materials as carbon blacks (acetylene black, thermal black, channel black and the like), graphite powder, metal powder, but not limited thereto.

Exemplary binders include fluoropolymers such as polytetrafluoroethylene and polyvinylidene fluoride, polyolefin-based polymers such as polyethylene and polypropylene, and synthetic rubbers, but not limited thereto.

The mixing ratio is about 5 to 50 parts by weight of the conductive material and about 1 to 30 parts by weight of the binder with respect to 100 parts by weight of the active material. If the proportion of the conductive material is less than 5 parts by weight or the ratio of the binder is greater than 30 parts by weight, a practical lithium secondary battery cannot be fabricated, because the resistance or polarization of the electrode is increased, thereby decreasing the discharging capacity. If the proportion of the conductive material is greater than 50 parts by weight (which may vary depending on the conductive material to be blended), the discharge capacity of the positive electrode is undesirably reduced, because the relative content of the active material in the electrode is reduced. If the proportion of the binder is less than 1 part by weight, the binding ability is lost. If the proportion of the binder is greater than 30 parts by weight, the relative content of the active material in the electrode is reduced, like the case of the binder. Further, the resistance or polarization of the electrode is increased, so that the discharge capacity thereof is undesirably reduced. Thus, the resultant lithium secondary battery is not suitable for practical use.

The composite negative electrode in accordance with the present invention has a high capacity. Since the composite negative electrode improves the initial charge-discharge efficiency, the irreversible capacity can be compensated by employing a negative electrode formed of a reduced amount of the positive-electrode active material for fabrication of a secondary battery. The use of the composite negative electrode formed of the graphite and copper oxide in accordance with the present invention enables the lithium secondary battery to exhibit a high capacity. A capacity attributable to the nature of the copper oxide as a positive electrode active material for a primary battery serves as a capacity of the secondary battery when the copper oxide is reduced upon collapse of crystalline structure of the copper oxide. In this case, it is considered that the copper oxide forms a composite oxide together with lithium.

In the present invention, secondary negative-electrode active materials include the following three types:
(1) Cupric oxide having a low crystallinity;
(2) Mixture of a cupric oxide having a low crystallinity and a cuprous oxide resulting from the reduction of the cupric oxide; and
(3) Lithium-containing copper oxide.

The initial charge-discharge efficiency can be totally improved by the following reasons.
(a) The reversible capacity attributed to copper oxide is increased, while maintaining the charge-discharge efficiency at a conventional level (The amount of copper oxide to be added to graphite can be reduced to totally increase the charge-discharge efficiency.).

(b) The initial charge-discharge efficiency is increased, while maintaining the reversible capacity attributed to copper oxide at a conventional level.

To totally improve the initial charge-discharge efficiency, the reason (a) is mainly applied to the secondary negative-electrode active material (1), and the reason (b) is mainly applied to the secondary negative-electrode active materials (1) and (2). More specifically, the secondary negative-electrode active material (1) forms a composite oxide with lithium to increase the reversible capacity, thereby totally improving the initial charge-discharge efficiency. The secondary negative-electrode active material (2) decreases the capacity attributed to formation of an irreversible substance such as copper resulting from the reduction of copper oxide. As a result, the initial charge-discharge efficiency of the negative electrode and, hence, that of the entire secondary battery can be improved. The secondary negative-electrode active material (3) comprising lithium-containing copper oxide readily forms a substance capable of irreversibly reacting with lithium. As a result, the initial charge-discharge efficiency of the negative electrode and, hence, that of the entire secondary battery can be improved.

EXAMPLE

The present invention will hereinafter be described in detail by way of examples thereof.

The crystallite sizes Lc and La can be determined by the X-ray wide-angle diffraction analysis in such a manner as described in Carbon Material Experimental Technology Vol. 1, pp. 55–63 (compiled by Association of Carbon materials and published by Science and Technology Co., Ltd.) or in Japanese Unexamined Patent Publication No. 61-111907. In the following Examples, the form factor K employed for the determination of the crystallite sizes was 0.9. The particle size was determined as a peak particle size in a particle size distribution obtained by a particle size distribution analyzer of laser diffraction type.

Example 1

Preparation of Negative-Electrode Active material

Natural graphite (flake-graphited, particle size: 11 μm, $d_{002}$:0.337 nm, Lc: 27 nm, La: 17 nm, specific surface area: 8 m²/g) produced in Madagascar was used as a primary negative-electrode active material. Basic cupric carbonate was heat-treated in the air at a temperature of 310° C. for two hours to be used as a secondary negative-electrode active material. The secondary negative-electrode active material thus obtained was identified as cupric oxide by way of X-ray diffraction analysis. The secondary negative-electrode active material had a peak representing (111) plane at 38.60° and the half band width thereof was 1.21° in its X-ray diffraction pattern. The graphite and cupric oxide were mixed in a weight ratio of 9.2:0.8. Thus, a negative-electrode active material was obtained.

Preparation of Negative Electrode

In general, a negative electrode is fabricated by applying a mixture of a negative-electrode active material and a binder onto a current collector, or by pressure-molding the mixture together with the current collector. The binder may be blended in a powder form with the negative-electrode active material or, alternatively, blended after the binder is dispersed or dissolved in a solvent to enhance the dispersibility and binding ability. Where the binder dispersed or dissolved in the solvent is mixed with the negative-electrode active material, the solvent should be thereafter removed from the resultant paste mixture by way of vacuum treatment or heat treatment. The binding ability of a certain binder may be increased by heat treating the mixture around a melting point of the binder.

In this Example, the negative-electrode active materials were added to a solution in which 10 parts by weight of polyvinylidene fluoride relative to the total amount (100 parts by weight) of the negative-electrode active materials was dissolved in a solvent of N-methyl-2-pyrrolidone, and the mixture was kneaded into a paste form. The paste thus obtained was applied onto opposite surfaces of a copper-foil current collector, and then dried at a temperature of 60° C., and the solvent was completely removed therefrom. The paste was heat-treated at a temperature of 240° C. for enhancement of the binding ability, then pressed, and dried under reduced pressure at a temperature of 200° C. for removal of moisture. Thus, a negative electrode was prepared. The negative electrode had a surface area of 8 cm² and a thickness of 135 μm (the thickness of the current collector was 50 μm).

Evaluation of Negative Electrode

The negative electrode was evaluated by the three-electrode method. A lead wire was attached to the copper-foil current collector of the negative electrode to collect current, and lithium plates were employed as a counter electrode and reference electrode. An electrolyte was prepared by dissolving lithium perchlorate in a concentration of 1 mol/l in a solvent mixture containing ethylene carbonate and diethyl carbonate in a ratio of 1:1.

In a charge-discharge test, the negative electrode was initially charged at a current density of 30 mA/g up to 0 V, and then discharged to 2.5 V at the same current density. Thereafter, the negative electrode was repeatedly charged and discharged in the same potential range and at the same current density. Thus, the negative electrode was evaluated by measuring the discharge capacity thereof. As a result, the initial charge-discharge efficiency was 86%, and the discharge capacities in the first and 20th charge-discharge cycles were 412 mAh/cm³ and 385 mAh/cm³, respectively. The test result is shown in Table 1.

Example 2

A negative electrode was fabricated and evaluated in substantially the same manner as in Example 1, except that cupric oxide used as a secondary negative-electrode active material was prepared by heat-treating cupric hydroxide in the air at a temperature of 350° C. for two hours. The cupric oxide thus prepared had a peak representing (111) plane at 38.67° and the half band width thereof was 1.35° in its X-ray diffraction pattern. The negative-electrode thus fabricated had a surface area of 8 cm² and a thickness of 128 μm (the thickness of the current collector was 50 μm). As the result of the evaluation test of the negative electrode, the initial charge-discharge efficiency was 84%, and the discharge capacities in the first and 20th charge-discharge cycles were 422 mAh/cm³ and 392 mAh/cm³, respectively. The test result is shown in Table 1.

Reference Example 1

A negative electrode was fabricated in substantially the same manner as in Example 1, except that reagent-grade cupric oxide was used as a secondary negative-electrode active material. In this case, the reagent-grade cupric oxide had a peak representing (111) plane at 38.66° and the half band width thereof was 0.22° in its X-ray diffraction pattern. The negative electrode thus fabricated had a surface area of 8 cm² and a thickness of 130 μm (the thickness of the current collector was 50 μm). As the result of the evaluation test of the negative electrode, the initial charge-discharge efficiency was 75%, and the discharge capacities in the first and 20th charge-discharge cycles were 382 mAh/cm³ and 375 mAh/cm³, respectively. The test result is shown in Table 1.

TABLE 1

|  | Example 1 | Example 2 | Ref. Example 1 |
|---|---|---|---|
| Starting Material | Basic cupric carbonate | Cupric hydroxide | Reagent-grade cupric oxide |
| Treatment Temp. (°C.) | 310 | 350 | — |
| Atmosphere | Air | Air | — |
| Peak Position (2θ) | 38.6 | 38.67 | 38.66 |
| Half Band width (deg) | 1.21 | 0.64 | 0.22 |
| Initial Charge-Discharge Efficiency (%) | 86 | 84 | 75 |
| Discharge Capacity (mAh/cm³) |  |  |  |
| 1st cycle | 412 | 422 | 382 |
| 20th cycle | 385 | 392 | 375 |

As can be seen from Table 1, a negative electrode exhibiting a higher initial charge-discharge efficiency and higher discharge capacity can be obtained by employing a cupric oxide having a low crystallinity as determined by the X-ray crystallographic analysis.

Example 3

A negative electrode was fabricated and evaluated in substantially the same manner as in Example 1, except that cupric oxide used as a secondary negative-electrode active material was prepared by heat-treating basic cupric carbonate in the air at a temperature of 250° C. for two hours. The cupric oxide thus prepared had a peak representing (111) plane at 38.62° and the half band width thereof was 1.31° in its X-ray diffraction pattern. The negative electrode thus fabricated had a surface area of 8 cm² and a thickness of 145 μm (the thickness of the current collector was 50 μm). As the result of the evaluation test of the negative electrode, the initial charge-discharge efficiency was 86%, and the discharge capacities in the first and 20th charge-discharge cycles were 425 mAh/cm³ and 403 mAh/cm³, respectively. The test result is shown in Table 2.

Example 4

A negative electrode was fabricated and evaluated in substantially the same manner as in Example 1, except that cupric oxide used as a secondary negative-electrode active material was prepared by heat-treating cupric hydroxide in the air at a temperature of 145° C. for two hours. The cupric oxide thus prepared had a peak representing (111) plane at 38.67° and the half band width thereof was 1.06° in its X-ray diffraction pattern. The negative electrode thus fabricated had a surface area of 8 cm² and a thickness of 118 μm (the thickness of the current collector was 50 μm). As the result of the evaluation test of the negative electrode, the initial charge-discharge efficiency was 84%, and the discharge capacities in the first and 20th charge-discharge cycles were 413 mAh/cm³ and 399 mAh/cm³, respectively. The test result is shown in Table 2.

Example 5

A negative electrode was fabricated and evaluated in substantially the same manner as in Example 1, except that a synthetic graphite KS-25 (flake graphited, particle size: 8 μm, $d_{002}$:0.336 nm, Lc: 25 nm, La: 16 nm, specific surface area: 12 m²/g) available from Ronza Inc. was used as a primary negative-electrode active material and cupric oxide used as a secondary negative-electrode active material was prepared by heat-treating cupric hydroxide in the air at a temperature of 300° C. for two hours. The cupric oxide thus prepared had a peak representing (111) plane at 38.39° and the half band width thereof was 0.72° in its X-ray diffraction pattern. The negative electrode thus fabricated had a surface area of 8 cm² and a thickness of 131 μm (the thickness of the current collector was 50 μm). As the result of the evaluation test of the negative electrode, the initial charge-discharge efficiency was 85%, and the discharge capacities in the first and 20th charge-discharge cycles were 410 mAh/cm³ and 396 mAh/cm³, respectively The test result is shown in Table 2.

Example 6

A negative electrode was fabricated and evaluated in substantially the same manner as in Example 5, except that cupric oxide used as a secondary negative-electrode active material was prepared by heat-treating cupric hydroxide in the air at a temperature of 600° C. for two hours. The cupric oxide thus prepared had a peak representing (111) plane at 38.73° and the half band width thereof was 0.38° in its X-ray diffraction pattern. The negative electrode thus fabricated had a surface area of 8 cm² and a thickness of 122 μm (the thickness of the current collector was 50 μm). As the result of the evaluation test of the negative electrode, the initial charge-discharge efficiency was 81%, and the discharge capacities in the first and 20th charge-discharge cycles were 405 mAh/cm³ and 395 mAh/cm³, respectively. The test result is shown in Table 2.

Example 7

A graphite material used as a primary negative-electrode material was prepared in the following manner. A synthetic graphite KS-25 (flake-graphited, particle size: 8 μm, $d_{002}$: 0.336 nm, Lc: 25 nm, La: 16 nm, specific surface area: 12 m²/g) available from Ronza Inc. was used as core particles of the primary negative-electrode active material. The graphite core particles were mixed with tar in a weight ratio of 95:25. The mixture was calcinated in a nitrogen atmosphere at a temperature of 300° C. for two hours, and then at a temperature of 1000° C. for five hours. In this case, carbon yield from calcinated tar was 20%, and the weight ratio of carbon content attributed to graphite to that attributed to tar was 95:5. Cupric oxide used as a secondary negative-electrode active material was prepared by heat-treating cupric hydroxide in a nitrogen atmosphere at a temperature of 300° C. for two hours. A negative electrode was fabricated by employing these negative-electrode active materials and evaluated in substantially the same manner as in Example 1. The cupric oxide thus prepared had a peak representing (111) plane at 38.71° and the half band width thereof was 0.83° in its X-ray diffraction pattern. The negative electrode thus fabricated had a surface area of 8 cm² and a thickness of 130 μm (the thickness of the current collector was 50 μm). As the result of the evaluation test of the negative electrode, the initial charge-discharge efficiency was 86%, and the discharge capacities in the first and 20th charge-discharge cycles were 428 mAh/cm³ and 411 mAh/cm³, respectively. The test result is shown in Table 2.

Example 8

A negative electrode was fabricated and evaluated in substantially the same manner as in Example 7, except that cupric oxide used as a secondary negative-electrode active material was prepared by heat-treating cupric hydroxide in a nitrogen atmosphere at a temperature of 500° C. for two hours. The cupric oxide thus prepared had a peak representing (111) plane at 38.71° and the half band width thereof was 0.32° in its X-ray diffraction pattern. The negative electrode thus fabricated had a surface area of 8 cm² and a thickness of 128 μm (the thickness of the current collector was 50 μm). As the result of the evaluation test of the negative electrode, the initial charge-discharge efficiency was 86%, and the discharge capacities in the first and 20th charge-discharge cycles were 428 mAh/cm³ and 411 mAh/cm³, respectively. The test result is shown in Table 2.

Reference Example 2

A negative electrode was fabricated and evaluated in substantially the same manner as in Example 5, except that cupric oxide used as a secondary negative-electrode active material was prepared by heat-treating cupric hydroxide in the air at a temperature of 700° C. for two hours. The cupric oxide thus prepared had a peak representing (111) plane at 38.72° and the half band width thereof was 0.25° in its X-ray diffraction pattern. The negative electrode thus fabricated had a surface area of 8 cm² and a thickness of 130 μm (the thickness of the current collector was 50 μm). As the result of the evaluation test of the negative electrode, the initial charge-discharge efficiency was 76%, and the discharge capacities in the first and 20th charge-discharge cycles were 388 mAh/cm³ and 376 mAh/cm³, respectively. The test result is shown in Table 2.

Reference Example 3

A negative electrode was fabricated and evaluated in substantially the same manner as in Example 5, except that cupric oxide used as a secondary negative-electrode active material was prepared by heat-treating cupric hydroxide in a nitrogen atmosphere at a temperature of 700° C. for two hours. The cupric oxide thus prepared had a peak representing (111) plane at 38.74° and the half band width thereof was 0.24° in its X-ray diffraction pattern. The negative electrode thus fabricated had a surface area of 8 cm² and a thickness of 131 μm (the thickness of the current collector was 50 μm). As the result of the evaluation test of the negative electrode, the initial charge-discharge efficiency was 74%, and the discharge capacities in the first and 20th charge-discharge cycles were 381 mAh/cm³ and 365 mAh/cm³, respectively. The test result is shown in Table 2.

TABLE 2

|  | Example 3 | Example 4 | Example 5 | Example 6 | Example 7 | Example 8 | Ref. Example 2 | Ref. Example 3 |
| --- | --- | --- | --- | --- | --- | --- | --- | --- |
| Starting Material | Basic cupric carbonate | Cupric hydroxide | Cupric hydroxide | Cupric hydroxide | Cupric hydroxide | Cupric hydroxide | Cupric hydroxide | Cupric hydroxide |
| Treatment Temp. (°C.) | 250 | 145 | 300 | 500 | 300 | 500 | 700 | 700 |
| Atmosphere | Air | Air | Air | Air | Nitrogen | Nitrogen | Air | Nitrogen |
| Peak Position (2θ) | 38.62 | 38.67 | 38.69 | 38.73 | 38.71 | 38.71 | 38.72 | 38.74 |
| Half Band Width (deg) | 1.31 | 1.06 | 0.72 | 0.38 | 0.83 | 0.32 | 0.25 | 0.24 |
| Initial Charge-Discharge Efficiency (%) | 86 | 84 | 85 | 81 | 89 | 86 | 76 | 74 |
| Discharge Capacity (mAh/cm³) |  |  |  |  |  |  |  |  |
| 1st cycle | 425 | 413 | 410 | 405 | 428 | 398 | 388 | 381 |
| 20th cycle | 403 | 399 | 396 | 395 | 411 | 395 | 376 | 365 |

As can be seen from Table 2, a high-capacity negative electrode can be obtained by employing as a secondary negative-electrode active material a cupric oxide prepared by heat-treating a copper compound. Further, a cupric oxide having an X-ray diffraction pattern in which the half band width of a peak around 38.9° representing (111) plane is not less than 0.3° leads to a preferable result. Still further, a cupric oxide prepared by heat-treating a copper compound at a temperature of not higher than 600° C. leads to a preferable result. Reduction in the initial charge-discharge efficiency due to electrolysis of the electrolyte by graphite can be suppressed by employing graphite particles coated with amorphous carbon. Thus, the initial charge-discharge efficiency can be further improved.

Example 9

Cupric oxide prepared by heat-treating cupric hydroxide in the air at a temperature of 250° C. was subjected to reduction in the presence of propane at a temperature of 400° C. for one hour. The source material of cupric oxide had a peak representing (111) plane at 38.72° and the half band width thereof was 0.89° in its X-ray diffraction pattern. The substance obtained by the reduction was identified as cuprous oxide by the X-ray diffraction analysis. By employing the cuprous oxide thus prepared as a secondary negative-electrode active material and spherical graphite particles (particle size: 6 μm, $d_{002}$:0.337 μm, Lc: 13 nm, La: 11 nm, specific surface area: 8 m²/g) as a primary negative-electrode active material, a negative electrode was fabricated in substantially the same manner as in Example 1. The negative electrode thus fabricated was evaluated in substantially the same manner as in Example 1, except that the solvent mixture used for the electrolyte was prepared by mixing polypropylene carbonate and ethylene carbonate in a mixing ratio of 1:1. The negative electrode had a surface area of 8 cm² and a thickness of 130 μm (the thickness of the current collector was 50 μm). As the result of the evaluation test of the negative electrode, the initial charge-discharge efficiency was 87%, and the discharge capacities in the first and 20th charge-discharge cycles were 405 mAh/cm³ and 394 mAh/cm³, respectively. The test result is shown in Table 3.

Example 10

Cupric oxide prepared by heat-treating cupric hydroxide in the air at a temperature of 400° C. was subjected to reduction in the presence of propane at a temperature of 600° C. for one hour. The source material of cupric oxide had a peak representing (111) plane at 38.72° and the half band width thereof was 0.67° in its X-ray diffraction pattern. The substance obtained by the reduction was identified as cuprous oxide by the X-ray diffraction analysis. A negative electrode was fabricated and evaluated in substantially the same manner as in Example 9, except that the cuprous oxide thus prepared was employed as a secondary negative-electrode active material. The negative electrode had a surface area of 8 cm$^2$ and a thickness of 128 μm (the thickness of the current collector was 50 μm). As the result of the evaluation test of the negative electrode, the initial charge-discharge efficiency was 89%, and the discharge capacities in the first and 20th charge-discharge cycles were 410 mAh/cm$^3$ and 396 mAh/cm$^3$, respectively. The test result is shown in Table 3.

Reference Example 4

Cupric oxide prepared by heat-treating cupric hydroxide in the air at a temperature of 300° C. was subjected to reduction in the presence of propane at a temperature of 700° C. for one hour. The source material of cupric oxide had a peak representing (111) plane at 38.72° and the half band width thereof was 0.72° in its X-ray diffraction pattern. The substance obtained by the reduction was identified as cuprous oxide by the X-ray diffraction analysis. A negative electrode was fabricated and evaluated in substantially the same manner as in Example 9, except that the cuprous oxide thus prepared was employed as a secondary negative-electrode active material. The negative electrode had a surface area of 8 cm$^2$ and a thickness of 124 μm (the thickness of the current collector was 50 μm). As the result of the evaluation test of the negative electrode, the initial charge-discharge efficiency was 82%, and the discharge capacities in the first and 20th charge-discharge cycles were 408 mAh/cm$^3$ and 390 mAh/cm$^3$, respectively. The test result is shown in Table 3.

Reference Example 5

Cupric oxide prepared by heat-treating cupric hydroxide in the air at a temperature of 700° C. was subjected to reduction in the presence of propane at a temperature of 400° C. for one hour. The source material of cupric oxide had a peak representing (111) plane at 38.72° and the half band width thereof was 0.25° in its X-ray diffraction pattern. The substance obtained by the reduction was identified as cuprous oxide by the X-ray diffraction analysis. A negative electrode was fabricated and evaluated in substantially the same manner as in Example 9, except that the cuprous oxide thus prepared was employed as a secondary negative-electrode active material. The negative electrode had a surface area of 8 cm$^2$ and a thickness of 118 μm (the thickness of the current collector was 50 μm). As the result of the evaluation test of the negative electrode, the initial charge-discharge efficiency was 81%, and the discharge capacities in the first and 20th charge-discharge cycles were 403 mAh/cm$^3$ and 388 mAh/cm$^3$, respectively. The test result is shown in Table 3.

Example 11

Cuprous oxide and lithium hydroxide were mixed in a mortar such that the molar ratio of copper atoms to lithium atoms was 1:1. The powder mixture was pressure-molded, and pre-calcinated in a nitrogen atmosphere at a temperature of 400° C. for four hours. The calcinated substance was powdered in a mortar, then pressure-molded, and calcinated in a nitrogen atmosphere at a temperature of 700° C. for five hours. The substance thus obtained was identified as LiCuO by the X-ray diffraction analysis. A negative electrode was fabricated and evaluated in substantially the same manner as in Example 9, except that the prepared lithium-containing copper oxide was employed as a secondary negative-electrode active material. The negative electrode had a surface area of 8 cm$^2$ and a thickness of 131 μm (the thickness of the current collector was 50 μm). As the result of the evaluation test of the negative electrode, the initial charge-discharge efficiency was 89%, and the discharge capacities in the first and 20th charge-discharge cycles were 401 mAh/cm$^3$ and 392 mAh/cm$^3$, respectively. The test result is shown in Table 3.

Example 12

Cupric oxide and lithium carbonate were fully mixed in a mortar such that the molar ratio of copper atoms to lithium atoms was 1:2. The powder mixture was pressure-molded, and calcinated in a nitrogen atmosphere at a temperature of 720° C. for 11 days. The substance thus obtained was identified as Li$_2$CuO$_2$ by the X-ray diffraction analysis. A negative electrode was fabricated and evaluated in substantially the same manner as in Example 9, except that the prepared lithium-containing copper oxide was employed as a secondary negative-electrode active material. The negative electrode had a surface area of 8 cm$^2$ and a thickness of 131 μm (the thickness of the current collector was 50 μm). As the result of the evaluation test of the negative electrode, the initial charge-discharge efficiency was 88%, and the discharge capacities in the first and 20th charge-discharge cycles were 398 mAh/cm$^3$ and 388 mAh/cm$^3$, respectively. The test result is shown in Table 3.

Example 13

Basic cupric carbonate and lithium hydroxide were mixed in a mortar such that the molar ratio of copper atoms to lithium atoms was 1:1. The powder mixture was pressure molded, and calcinated in the air at a temperature of 900° C. for five hours. The substance thus obtained was identified as LiCuO by the X-ray diffraction analysis. A negative electrode was fabricated and evaluated in substantially the same manner as in Example 9, except that the prepared lithium-containing copper oxide was employed as a secondary negative-electrode active material. The negative electrode had a surface area of 8 cm$^2$ and a thickness of 125 μm (the thickness of the current collector was 50 μm). As the result of the evaluation test of the negative electrode, the initial charge-discharge efficiency was 88%, and the discharge capacities in the first and 20th charge-discharge cycles were 402 mAh/cm$^3$ and 390 mAh/cm$^3$, respectively. The test result is shown in Table 3.

TABLE 3

| | Initial Charge-Discharge Capacity (%) | Discharge Capacity (mAh/cm$^3$) | |
|---|---|---|---|
| | | 1st cycle | 20th cycle |
| Example 9 | 87 | 405 | 394 |
| Example 10 | 89 | 410 | 396 |
| Example 11 | 89 | 401 | 392 |

TABLE 3-continued

|  | Initial Charge-Discharge Capacity (%) | Discharge Capacity (mAh/cm³) | |
|---|---|---|---|
|  |  | 1st cycle | 20th cycle |
| Example 12 | 88 | 398 | 388 |
| Example 13 | 88 | 402 | 390 |
| Ref. Example 4 | 82 | 405 | 386 |
| Ref. Example 5 | 81 | 403 | 385 |

As can be seen from Table 3, a high-capacity composite negative electrode exhibiting an increased initial charge-discharge efficiency can be obtained by employing as a secondary negative-electrode active material a lithium-containing copper oxide or copper oxide which is prepared by heat-treating a cupric oxide having a low crystallinity in a reducing atmosphere. Further, where the heat treatment for preparation of cupric oxide is carried out at an excessively high temperature or the reduction process is carried out at a temperature exceeding 600° C., the initial charge-discharge efficiency is reduced.

Example 14

In general, a positive electrode is fabricated by blending a conductive material and a binder with a positive-electrode material. Exemplary conductive materials include carbon materials such as carbon black and graphite, and metal materials such as metal powder and metal wool. The binder may be blended in a powder form with the positive-electrode material or, alternatively, blended after the binder is dispersed or dissolved in a solvent to enhance the dispersibility and binding ability. Where the binder dispersed or dissolved in the solvent is mixed with the positive-electrode material, the solvent should be thereafter removed from the resultant paste mixture by way of vacuum treatment or heat treatment. The binding ability of a certain binder may be increased by heat-treating the paste mixture around a melting point of the binder.

Figure 1:
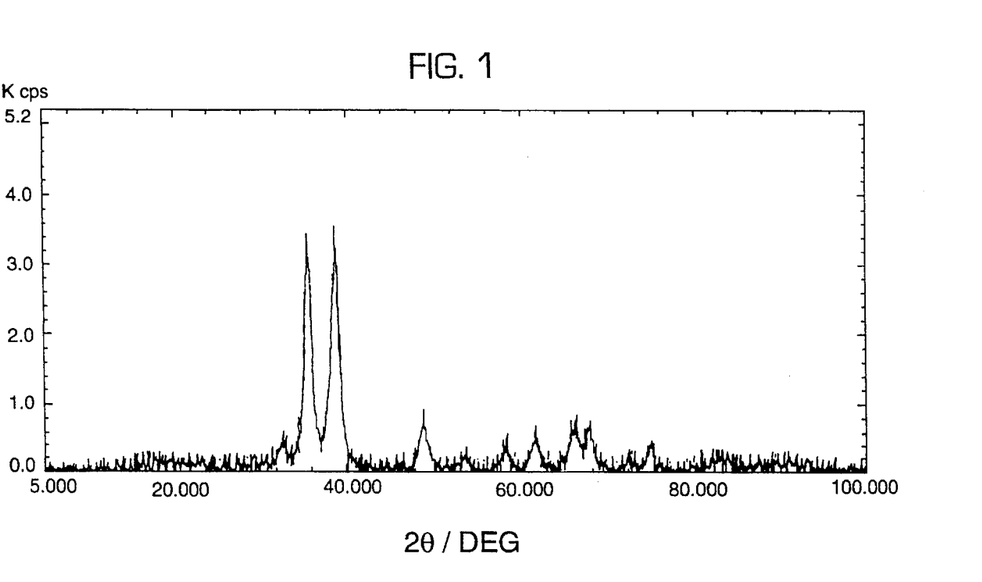
FIG. 1 is a graphic representation showing an X-ray diffraction pattern of CuO prepared in EXAMPLE 1 of the present invention.
Figure 2:
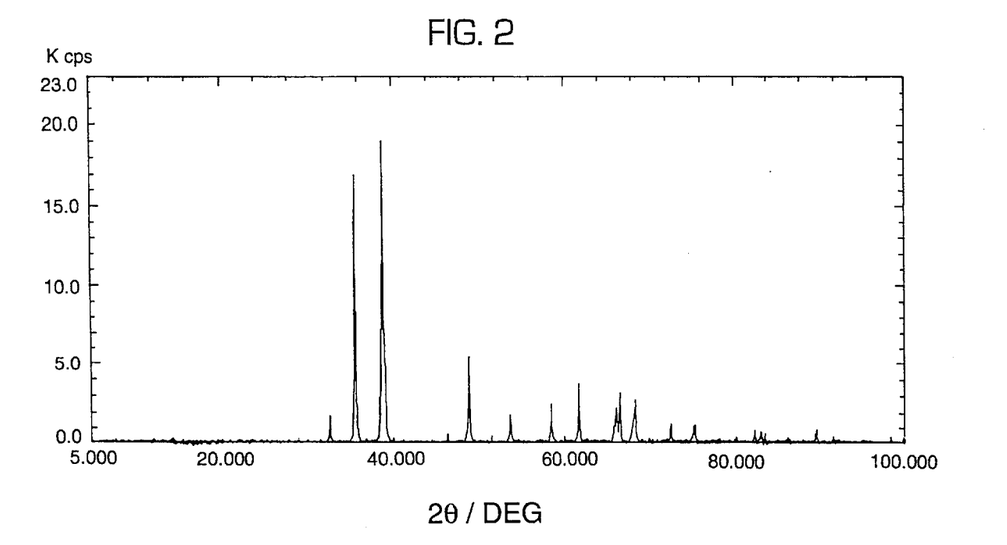
FIG. 2 is a graphic representation showing an X-ray diffraction pattern of CuO prepared in COMPARATIVE EXAMPLE 1.
Figure 3:
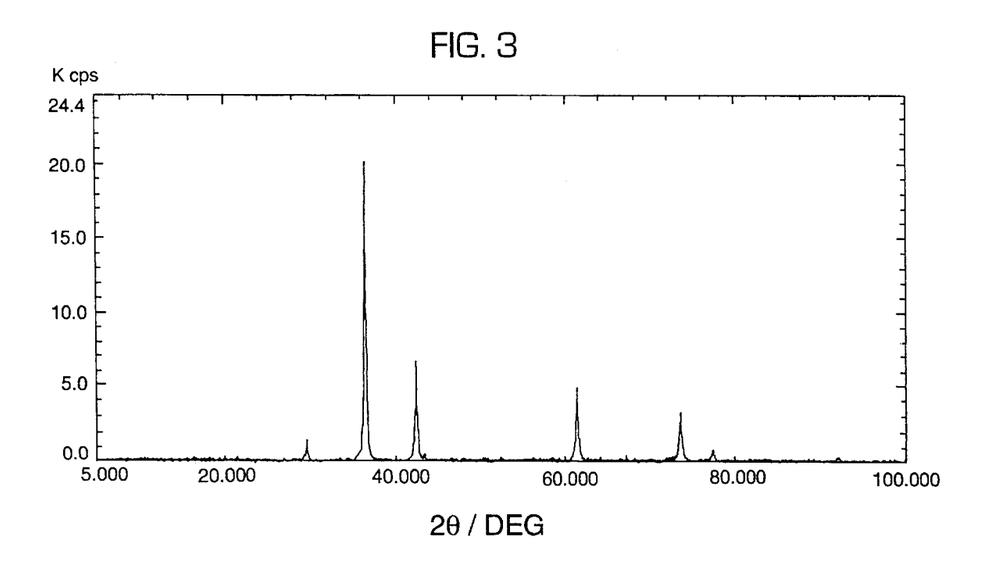
FIG. 3 is a graphic representation showing an X-ray diffraction pattern of $Cu_2O$ prepared in EXAMPLE 9 of the present invention.
Figure 4:
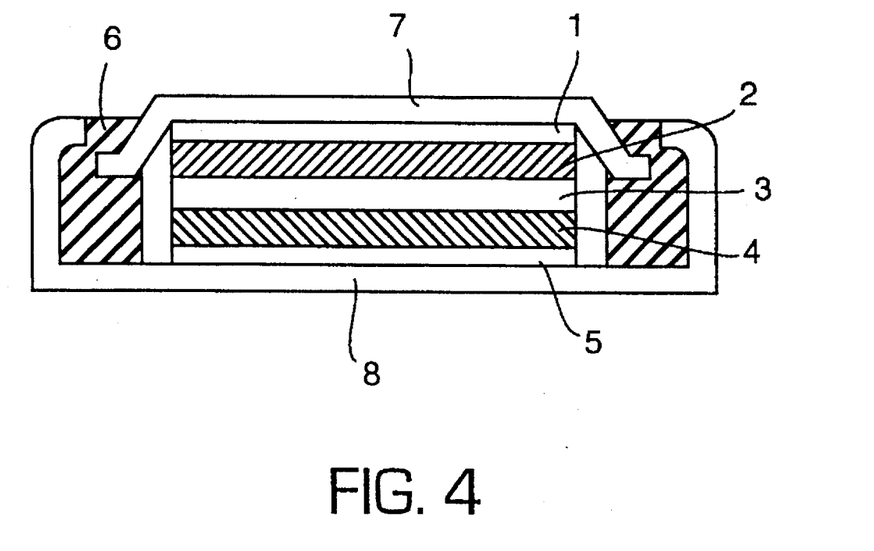
FIG. 4 is a vertical sectional view of a coin-type battery in accordance with the present invention.

In this embodiment, 10 parts by weight of acetylene black serving as a conductive material and 10 parts by weight of polytetrafluoroethylene powder serving as a binder were mixed with $LiCuO_2$ (100 parts by weight) serving as a positive-electrode active material, and the powder mixture was formed into a 15 Φpellet. An electrolyte was prepared by dissolving $LiPF_6$ in a concentration of 1 mol/l in a solvent mixture containing ethylene carbonate and diethyl carbonate in a mixing ratio of 1:1. A negative electrode was prepared in the same manner as in Example 1 and formed into a 15 Φpellet. A coin-type battery as shown in FIG. 4 was fabricated by employing the positive electrode, negative electrode and electrolyte thus prepared. The coin-type battery included a negative electrode collector 1, negative electrode 2, separator 3, positive electrode 4, positive-electrode collector 5, seal packing 6, battery container cover 7 and battery container 8. A charge-discharge test was carried out at a constant current of 1 mA and in a charge-discharge potential range between 2.7 V and 4.1 V. The optimum amounts of the negative-electrode active material and the positive-electrode active material were determined so as to ensure the maximum capacity of the coin-type battery relative to the total volume thereof. In particular, the amount of the positive-electrode active material was calculated, by assuming that lithium can be intercalated into and deintercalated from the positive-electrode active material in a charging process when the composition ratio of lithium to the positive-electrode active material is up to 0.5 and by taking into consideration the initial irreversible capacity of the negative electrode. In the charge-discharge test, the coin-type battery was charged and discharged at a current of 1 mA and in a charge-discharge range between 2.5 V and 4.2 V. As a result, the capacity in the 10th charge-discharge cycle was 18 mAh.

Example 15

Lithium carbonate and manganese oxide were mixed in a mortar such that the molar ratio of lithium atoms to manganese atoms was 1.1:2. The powder mixture was calcinated in the air at a temperature of 900° C. for three days, and then powdered in a mortar. Thus, an active material of $LiMn_2O_4$ powder was obtained. A positive electrode was prepared by employing the active material thus obtained as a positive-electrode material, and a negative electrode was prepared in the same manner as in Example 9. A coin-type battery was fabricated in substantially the same manner as in Example 13 by employing the positive electrode and negative electrode thus prepared, and evaluated in the same manner as in Example 11. As a result, the capacity in the 10th cycle was 17 mAh.

Example 16

Lithium carbonate, cobalt carbonate and antimony trioxide were mixed in a mortar such that the molar ratio of lithium atoms, cobalt atoms and antimony atoms was 1:0.95:0.05. The powder mixture was calcinated in the air at a temperature of 900° C. for 20 hours, and then powdered in a mortar. An active material thus obtained was identified as $LiCo_{0.95}Sb_{0.05}O_2$. A positive electrode was prepared by employing the active material as a positive-electrode material, and a negative electrode was prepared in the same manner as in Example 11. A coin-type battery was fabricated in substantially the same manner as in Example 13 by employing the positive electrode and negative electrode thus prepared, and evaluated in the same manner as in Example 11. As a result, the capacity in the 10th cycle was 19 mAh.

Reference Example 6

A coin-type battery was fabricated in substantially the same manner as in Example 11, except that the negative electrode was prepared in the same manner as in Reference Example 1. The coin-type battery thus fabricated was evaluated in the same manner as in Example 11. As a result, the capacity in the 10th cycle was 13 mAh.

Reference Example 7

A coin-type battery was fabricated in substantially the same manner as in Example 11, except that graphite serving as a primary negative-electrode active material was employed as a sole negative electrode material. The coin-type battery thus fabricated was evaluated in the same manner as in Example 11. As a result, the capacity in the 10th cycle was 12 mAh.

As can be understood from the foregoing, the use of the composite negative electrode according to the present invention realizes a high-capacity battery.

The present invention provides for a high-capacity composite negative electrode. To improve the initial charge-discharge efficiency of the negative electrode, the irreversible capacity can be compensated by employing a reduced amount of the positive-electrode active material for a secondary battery. Thus, the use of the negative electrode according to the present invention realizes a lithium secondary battery having a high capacity.

What is claimed:

1. A lithium secondary battery comprising:

a positive electrode;

a negative electrode; and a nonaqueous ion conductor, said negative electrode including a primary negative-electrode active material of a graphite which intercalates and deintercalates lithium ions, and a secondary negative-electrode active material of a cupric oxide in an amorphous state or a microcrystal-aggregate state obtained by heat treating a copper compound.

2. A lithium secondary battery as set forth in claim 1, wherein said cupric oxide has an X-ray diffraction pattern in which a peak representing (111) plane appears around 38.9° and the half band width thereof is not less than 0.30°.

3. A lithium secondary battery as set forth in claim 1, wherein said graphite has a mean interlayer distance ($d_{002}$) between (002) planes of 0.335 nm to 0.340 nm, a crystallite size (Lc) in a (002) plane direction of not less than 10 nm and a crystallite size (La) in a (110) plane direction of not less than 10 nm.

4. A lithium secondary battery as set forth in claim 1, wherein said graphite is coated with an amorphous carbon.

5. A lithium secondary battery as set forth in claim 1, wherein the weight ratio of the graphite to the cupric oxide is 99:1 to 60:40.

6. A method for preparing a negative-electrode active material, comprising the step of providing a cupric oxide as recited in claim 1 by heat-treating a copper compound for the cupric oxide at a temperature not higher than 600° C. and not lower than a temperature at which the copper compound decomposes into the cupric oxide.

7. A lithium secondary battery comprising:

a positive electrode;

a negative electrode; and a nonaqueous ion conductor, said negative electrode including a primary negative-electrode active material of a graphite which intercalates and deintercalates lithium ions, and a secondary negative-electrode active material of either a cuprous oxide resulting from reduction of a cupric oxide in an amorphous state or a microcrystal-aggregate state obtained by heat treating a copper compound or a mixture of the cuprous oxide and the cupric oxide.

8. A lithium secondary battery as set forth in claim 7, wherein said cupric oxide has an X-ray diffraction pattern in which a peak representing (111) plane appears around 38.9° and the half band width thereof is not less than 0.30°.

9. A lithium secondary battery as set forth in claim 7, wherein said graphite has a mean interlayer distance ($d_{002}$) between (002) planes of 0.335 nm to 0.340 nm, a crystallite size (Lc) in a (002) plane direction of not less than 10 nm and a crystallite size (La) in a (110) plane direction of not less than 10 nm.

10. A lithium secondary battery as set forth in claim 7, wherein said graphite is coated with an amorphous carbon.

11. A lithium secondary battery as set forth in claim 7, wherein the weight ratio of the graphite to the copper oxide is 99:1 to 60:40.

12. A method for preparing a negative-electrode active material, comprising the step of providing a cupric oxide as recited in claim 7 by heat-treating a copper compound for the cupric oxide at a temperature not higher than 600° C. and not lower than a temperature at which the copper compound decomposes into the cupric oxide.

13. A lithium secondary battery comprising:

a positive electrode;

a negative electrode; and a nonaqueous ion conductor, said negative electrode including a primary negative-electrode active material of a graphite which intercalates and deintercalates lithium ions, and a secondary negative-electrode active material initially constructed of lithium-containing copper oxide.

14. A lithium secondary battery as set forth in claim 13, wherein said lithium-containing copper oxide is LiCuO or $Li_2CuO_2$.

15. A lithium secondary battery as set forth in claim 13, wherein said graphite has a mean interlayer distance ($d_{002}$) between (002) planes of 0.335 nm to 0.340 nm, a crystallite size (Lc) in a (002) plane direction of not less than 10 nm and a crystallite size (La) in a (110) plane direction of not less than 10 nm.

16. A lithium secondary battery as set forth in claim 13, wherein said graphite is coated with an amorphous carbon.

17. A lithium secondary battery as set forth in claim 13, wherein the weight ratio of the graphite to the copper oxide is 99:1 to 60:40.

* * * * *